United States Patent
Baumann

(10) Patent No.: US 9,216,723 B2
(45) Date of Patent: Dec. 22, 2015

(54) METHOD FOR CONTROLLING A WHEEL BRAKE PRESSURE IN A HYDRAULIC VEHICLE BRAKING SYSTEM

(75) Inventor: Dietmar Baumann, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 257 days.

(21) Appl. No.: 13/996,417

(22) PCT Filed: Oct. 25, 2011

(86) PCT No.: PCT/EP2011/068601
§ 371 (c)(1),
(2), (4) Date: Sep. 13, 2013

(87) PCT Pub. No.: WO2012/084308
PCT Pub. Date: Jun. 28, 2012

(65) Prior Publication Data
US 2013/0342005 A1 Dec. 26, 2013

(30) Foreign Application Priority Data
Dec. 23, 2010 (DE) .......................... 10 2010 064 035

(51) Int. Cl.
*B60T 13/16* (2006.01)
*B60T 8/40* (2006.01)

(52) U.S. Cl.
CPC .............. *B60T 13/168* (2013.01); *B60T 8/4031* (2013.01); *B60T 8/4086* (2013.01)

(58) Field of Classification Search
CPC .............. B60T 8/32; B60T 8/40; B60T 13/16; B60T 13/74; F15B 7/00; F04B 1/04

USPC ...................... 303/10, 11, 116.4, 119.2, 119.3
See application file for complete search history.

(56) References Cited

U.S. PATENT DOCUMENTS

| | | | |
|---|---|---|---|
| 6,446,435 B1 * | 9/2002 | Willmann et al. | 303/116.4 |
| 7,823,982 B2 * | 11/2010 | Reuter et al. | 303/10 |
| 8,287,054 B2 * | 10/2012 | Beer | 303/10 |

FOREIGN PATENT DOCUMENTS

| | | |
|---|---|---|
| DE | 198 25 114 A1 | 12/1999 |
| EP | 0 743 233 A2 | 11/1996 |
| WO | 2006/111393 A1 | 10/2006 |

OTHER PUBLICATIONS

International Search Report corresponding to PCT Application No. PCT/EP2011/068601, mailed Mar. 23, 2012 (German and English language document) (5 pages).

* cited by examiner

*Primary Examiner* — Melanie Torres Williams
(74) *Attorney, Agent, or Firm* — Maginot, Moore & Beck LLP

(57) ABSTRACT

A method for controlling the wheel brake pressures in wheel brake cylinders in a hydraulic vehicle braking system proposes to connect the wheel brake cylinders via wheel valves to a piston pump, the pistons of which are double-action pistons, and the two piston sides are connectable by means of pump valves. In order to increase the wheel brake pressure, the wheel valves are opened during a delivery stroke of the piston pump and the pump valves are closed, and the wheel valves are closed and the pump valves opened during a suction stroke. In order to reduce the wheel brake pressures, the valves are controlled in reverse.

13 Claims, 2 Drawing Sheets

METHOD FOR CONTROLLING A WHEEL BRAKE PRESSURE IN A HYDRAULIC VEHICLE BRAKING SYSTEM

This application is a 35 U.S.C. §371 National Stage Application of PCT/EP2011/068601, filed on Oct. 25, 2011, which claims the benefit of priority to Serial No. DE 10 2010 064 035.2, filed on Dec. 23, 2010 in Germany, the disclosures of which are incorporated herein by reference in their entirety.

The disclosure relates to a method for controlling a wheel brake pressure in a wheel brake cylinder of a slip-controlled hydraulic vehicle braking system having the features described herein.

The vehicle braking system is, in particular, slip-controlled, that is, it has an (anti-lock) braking control system, a traction control system and/or a stability control system, for which the abbreviations ABS, ASR, FDR, ESP are commonly used, or the vehicle braking system is an externally powered vehicle braking system in which a brake pressure is built up using a piston pump, in which case the externally powered vehicle braking system may have a slip control system. In the case of an externally powered vehicle braking system control of the wheel brake pressure is the normal case—that is, a service braking operation; the wheel brake pressure is controlled as a function of a reference value for the braking force. Additionally, or exclusively, depending on the driving situation, a slip control operation may take place. A control operation within the meaning of the disclosure also includes a control system. A wheel brake pressure in one or preferably a plurality of wheel brake cylinders of the vehicle braking system is controlled, it being possible to carry out wheel-individual control of the wheel brake pressures, group control of the wheel brake pressures in a plurality of wheel brake cylinders jointly, or control of the wheel brake pressure jointly in all the wheel brake cylinders.

BACKGROUND

Slip-controlled hydraulic vehicle braking systems are known; reference is made, for example, to the published patent application DE 198 25 114 A1. The known vehicle braking system has a muscle-power actuable brake master cylinder to which, for example, two brake circuits are connected via one isolation valve per brake circuit. One or more wheel brake cylinders of the hydraulic wheel brakes are connected to each brake circuit, each wheel brake cylinder having a brake pressure build-up valve by which it is connected to the brake circuit for wheel-individual control of the wheel brake pressure. In addition, each wheel brake cylinder has a brake pressure reducing valve by which it is connected to a suction side of a piston pump for wheel-individual control of the wheel brake pressure, the vehicle braking system having in each brake circuit a piston pump to which all the wheel brake cylinders of this brake circuit are connected via their brake pressure reducing valves. A pressure side of the piston pump is connected to the brake circuit between the isolation valve and the brake pressure build-up valves.

In order to reduce the wheel brake pressure in one or more wheel brake cylinders during a slip control operation, the respective brake pressure build-up valve is closed and the brake pressure reducing valve is opened, so that brake fluid flows out of the wheel brake cylinder. A build-up or increase of the wheel brake pressure is effected with the piston pump through the open brake pressure build-up valve, the brake pressure reducing valve being closed during the pressure build-up or pressure increase. Brake fluid can be delivered back to the brake master cylinder through the isolation valve.

SUMMARY

The hydraulic vehicle braking system according to the disclosure comprises at least one wheel brake cylinder and a piston pump to which the wheel brake cylinder is connected via a wheel valve. The reference to the valve as a "wheel valve" serves to provide an unambiguous designation of the valve and is intended to indicate its allocation to the wheel brake cylinder of the wheel brake of a vehicle wheel. A plurality of wheel brake cylinders may also be connected jointly to a wheel valve. During the controlling of the wheel brake pressure the piston pump is driven. The control of the wheel brake pressure or pressures is carried out for slip control and/or, in an externally powered vehicle braking system, during a service braking operation. The list of the control operations of the wheel brake pressures is not definitive.

In order to increase the wheel brake pressure during a wheel brake pressure control operation using the method according to the disclosure, the wheel valve is opened during a delivery stroke of the piston pump and closed during a suction stroke. The increasing of the wheel brake pressure also includes a build-up of the wheel brake pressure from zero. In order to reduce the wheel brake pressure, according to one embodiment, the wheel valve is controlled inversely; that is, it is closed during the delivery stroke of the piston pump and is opened during the suction stroke. For a relatively small increase or reduction of the wheel brake pressure, the wheel valve may be or closed during only a part of the respective stroke of the piston pump in a manner comparable to phase angle control. The wheel valve may also be opened in a clocked manner using pulse width modulation. With the use of a proportional control valve, partial opening of the wheel valve is possible. For wheel-individual control, the vehicle braking system has a piston pump for each wheel brake cylinder, or a multiple piston pump with one pump element for each wheel brake cylinder. If the wheel brake pressures are controlled in groups of wheel brake cylinders, or jointly in all wheel brake cylinders, one piston pump or pump element is sufficient for each group or for all wheel brake cylinders.

In contrast to the prior art, the wheel valve does not remain continuously open during a pressure build-up or a pressure reduction but is respectively opened during one stroke of the piston pump and closed during the opposite stroke.

The method has the advantage that it requires only one valve per wheel brake cylinder, namely the valve referred to here as the wheel valve. Hydraulic accumulators and non-return valves can be dispensed with and one type of valve is sufficient, preferably a valve which is open in the unenergized rest position. A further advantage of the method is the possibility of reversing the delivery direction of the piston pump away from the wheel brake cylinder in the direction of a brake master cylinder, for example. Furthermore, energy consumption and mechanical-hydraulic stress on the piston pump can be reduced if the wheel valve or wheel valves are opened during only a part of the delivery stroke in the case of a small increase of the wheel brake pressure.

Advantageous configurations and developments of the disclosure are further described herein.

BRIEF DESCRIPTION OF THE DRAWINGS

The disclosure is explained in more detail below with reference to two exemplary embodiments represented in the drawings. The two figures show hydraulic circuit diagrams of two embodiments of the disclosure. The figures should be understood as simplified and schematized representations for the purpose of understanding and explaining the disclosure.

DETAILED DESCRIPTION

Figure 1:
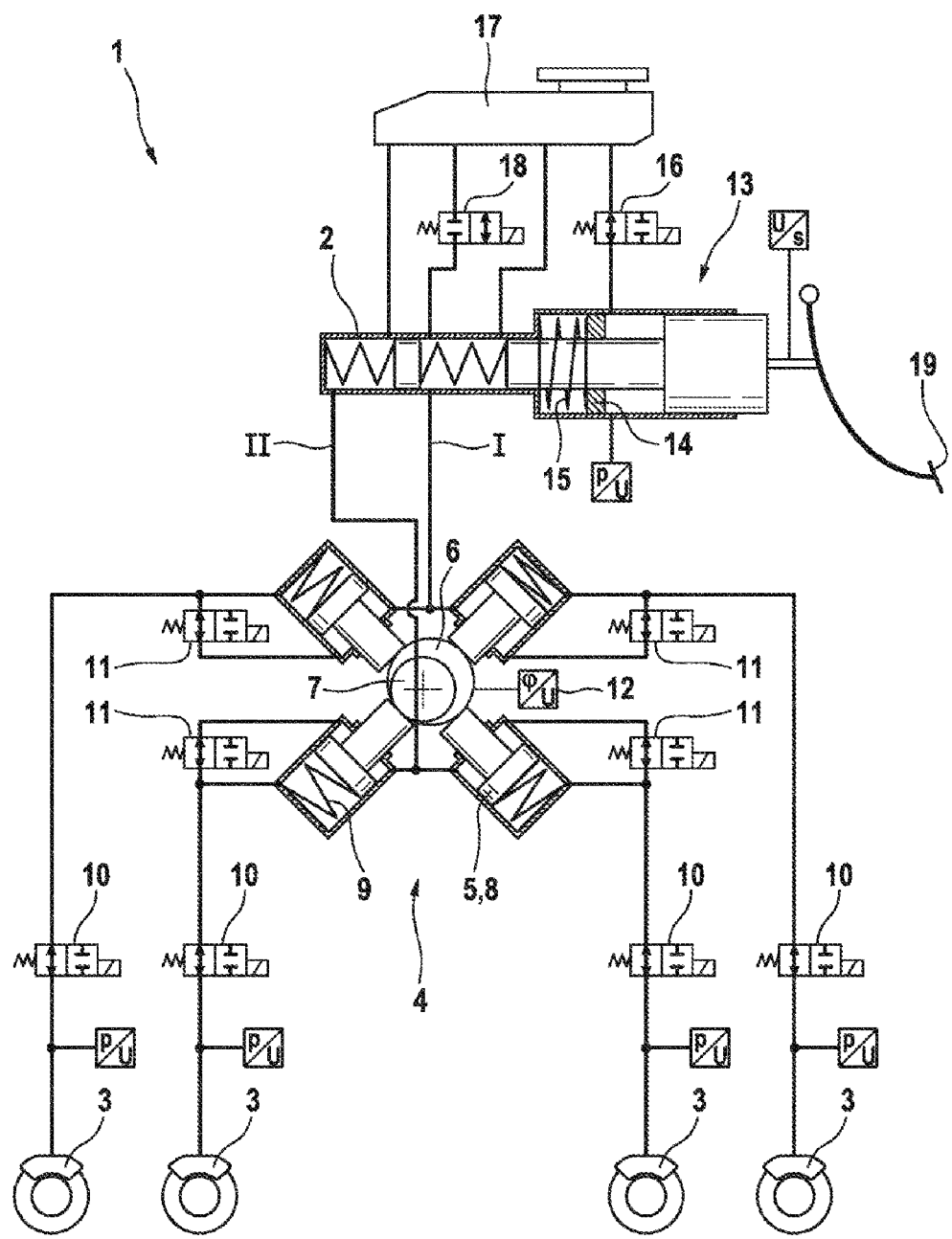

The hydraulic vehicle braking system 1 according to the disclosure represented in FIG. 1 comprises a tandem brake master cylinder 2, to which two brake circuits I, II are connected. In the exemplary embodiment the vehicle braking system 1 comprises four wheel brakes with wheel brake cylinders 3, which are allocated in pairs to the two brake circuits I, II. The number of four wheel brakes and their allocation to the brake circuits I, II is not essential to the disclosure. The vehicle braking system 1 includes a piston pump 4 with four pump elements 5, that is, one pump element 5 for each wheel brake cylinder 3. The pump elements 5 may also be understood as individual piston pumps. In the exemplary embodiment the pump elements 5 are arranged in a star-shaped configuration with an angular offset of 90° in each case around a cam 6, which is drivable in rotation around a camshaft 7. Pistons 8 of the pump elements 5 bear with their end faces against a circumference of the cam 6 and are held in abutment against the circumference of the cam 6 by piston springs 9. Rotational driving of the cam 6 drives the pistons 8 in a manner known per se to perform a reciprocating stroke motion.

The pistons 5 are double-acting; the one of their sides is connected to the brake master cylinder 2 and the other is connected via one wheel valve 10 in each case to the wheel brake cylinders 3. Each pump element 5 has a pump valve 11 by which the two sides of its piston 8 are connectable. The wheel valves 10 and the pump valves 11 are 2/2-way solenoid valves which are open in their unenergized rest position.

For a control operation of the wheel brake pressures in the wheel brake cylinders 3, the piston pump 4 is driven. To build up or increase the wheel brake pressure, the wheel valves 10 are opened during a delivery stroke of the respective allocated piston 8 and closed during a suction stroke. The wheel valves 10 therefore do not open and close simultaneously but successively, according to the phase offset of the pump elements 5. This also applies correspondingly to the pump valves 11. The pump valves 11 are controlled counter-synchronously with respect to the wheel valves 10; that is, they are closed during the delivery stroke of the allocated piston 8 and opened during the suction stroke. The stroke of one of the pistons 8 during which the piston 8 displaces brake fluid in the direction of the wheel brake cylinders 3 is referred to as the delivery stroke. In the exemplary embodiment, the piston 8 moves outwards during the delivery lift of the cam 6. In order to be able to determine the position of the pistons 8 and control the valves 10, 11 in dependence on the strokes of the pistons 8, the vehicle braking system 1 includes a pump position sensor 12. In the exemplary embodiment the pump position sensor 12 is a rotational angle sensor which measures a rotational angle of the cam 6.

During the delivery stroke, the pump pistons 8 draw brake fluid from the brake master cylinder 2 on their sides oriented towards the cam 6. In the suction stroke, during which the wheel valves 10 are closed, brake fluid flows through the then open pump valves 11 from the cam side of the pistons 8 to the side oriented away from the cam, so that during the following delivery stroke, with the pump valve 11 closed, it is displaced into the respective wheel brake cylinder 3 through the then open wheel valve 10.

In order to reduce the wheel brake pressures in the wheel brake cylinders 3, the wheel valves 10 and the pump valves 11 are controlled inversely to the procedure for increasing the wheel brake pressures; that is, the wheel valves 10 are closed during the delivery stroke directed outwardly away from the cam 6 and are opened during the suction stroke directed inwardly towards the cam 6, so that during the suction stroke the pistons 8 draw brake fluid from the wheel brake cylinders 3 through the open wheel valves 10. During the delivery stroke the pump valves 11 are opened, so that the brake fluid previously drawn from the wheel brake cylinders 3 is displaced by the pistons 8 to the other, cam-side piston sides, and from there flows to the brake master cylinder 2. During the suction stroke of the pistons 8 directed towards the cam 6, the pump valves 11 are closed, so that the cam-side sides of the pistons 8 displace brake fluid into the brake master cylinder 2.

In order to increase or reduce the wheel brake pressures in the wheel brake cylinders 3 only slightly, the wheel valves 10 and the pump valves 11 are not opened during the entire stroke but only during a part of the stroke of the respective piston 8, comparably to phase angle control.

As already stated, the wheel valves 10 and the pump valves 11 are open in their unenergized rest positions, so that the wheel brake cylinders 3 communicate with the brake master cylinder 2 through the wheel valves 10 and the pump valves 11, and the vehicle braking system 1 can be actuated by muscle power with the brake master cylinder 2 to perform a service braking operation, or an emergency braking operation in the event of a malfunction. For power-assisted braking, the brake master cylinder 2 may have a brake servo unit (not shown) which is known per se. Externally powered braking using the piston pump 4 is possible in the manner described above. Wheel-individual slip control, known per se, is likewise possible.

For externally powered braking, the brake master cylinder 2 has a pedal travel simulator 13 with an annular simulator piston 14 which works against a simulator spring 15. By closing a simulator valve 16 between a brake fluid reservoir 17 and the brake master cylinder 2, a brake fluid volume is enclosed in the pedal travel simulator 13, so that, in the case of actuation of the brake master cylinder 2 by muscle power, the simulator piston 14 is displaced by means of the brake pedal 18. In this case the simulator spring 15 exerts a pedal force on the brake pedal 18. In the case of externally powered braking, a chamber of the brake master cylinder 2 is depressurized by opening an uncoupling valve 18 which connects this chamber of the brake master cylinder 2 to the brake fluid reservoir 17. A brake pressure build-up is carried out with the piston pump 4 as described above.

Figure 2:
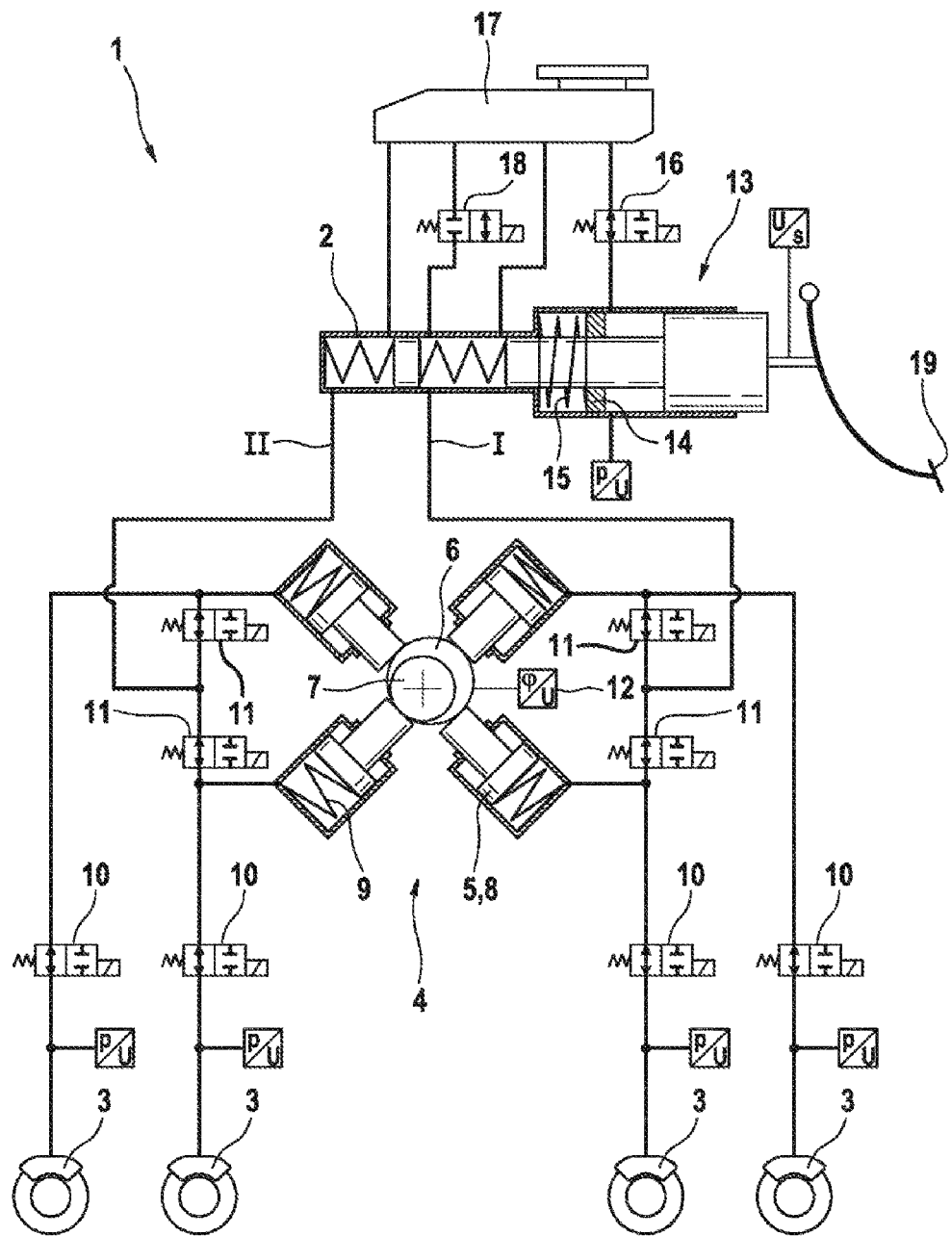

In FIG. 2 the pump elements 5 of the piston pump 4 have single-acting pistons 8. As in FIG. 1, wheel brake cylinders 3 are connected via wheel valves 10 to the pump elements 5. The pump elements 5 are connected on the same side of their pistons 8 as the wheel brake cylinders 3 via pump valves 11 to the brake master cylinder 2. A build-up or increase of wheel brake pressures in the wheel brake cylinders 3 is effected as described with reference to FIG. 1, in that the wheel valves 10 are opened and the pump valves 11 closed during the delivery stroke of the allocated piston 8, and, conversely, the wheel valves 10 are closed and the pump valves 11 opened during the suction stroke. During the delivery stroke the respective piston 8 displaces brake fluid through the wheel valve 10, which is open during the delivery stroke, into the connected wheel brake cylinder 3, having drawn off the brake fluid in the preceding suction stroke through the opened pump valve 11 with the wheel valve 10 closed. A reduction of the wheel brake pressures in the wheel brake cylinders 3 is effected by inverse controlling of the valves 10, 11; during the delivery stroke the wheel valves 10 are closed and the pump valves 11 opened, so that the pistons 8 displace brake fluid into the brake master cylinder 2 through the open pump valves 11. During the suction stroke, in order to reduce the wheel brake pressures, the wheel valves 10 are opened and the pump valves 11 closed, so that the pistons 8 draw brake fluid from the wheel brake cylinders 3.

With the exception of the differences explained, the hydraulic vehicle braking system 1 of FIG. 2 is constructed and functions in the same way as the vehicle braking system of FIG. 1. To avoid repetition, reference is made to the explanations of FIG. 1 to supplement the explanation of FIG. 2. Like components have the same reference numerals in both figures. As was said with reference to FIG. 1, for muscle-powered braking a conventional tandem brake master cylinder 2 without pedal travel simulator 13 can be used; for power-assisted braking, the brake master cylinder 2 may have a brake servo unit (not shown).

The invention claimed is:

1. A method for controlling a wheel brake pressure in a wheel brake cylinder of a hydraulic vehicle braking system, the vehicle braking system having at least one wheel brake cylinder, a piston pump with at least one double acting piston which is driven during the controlling of the wheel brake pressure, a pump valve connecting a first chamber of the piston pump defined at least in part by a first side of the at least one double-acting piston to a second chamber of the piston pump defined at least in part by a second side of the at least one double-acting piston, and a wheel valve via which the at least one wheel brake cylinder is connected to the piston pump, the method comprising:
   opening the wheel valve during a delivery stroke of the piston pump and closing the wheel valve during a suction stroke of the piston pump in order to increase the wheel brake pressure during wheel brake pressure control operations.

2. The method as claimed in claim 1, further comprising:
   closing the wheel valve during the delivery stroke of the piston pump and opening the wheel valve during the suction stroke of the piston pump in order to reduce the wheel brake pressure during wheel brake pressure control operations.

3. The method as claimed in claim 1, wherein the at least one wheel brake cylinder is connected to the first chamber of the piston pump solely via the wheel valve.

4. The method as claimed in claim 1, wherein the piston pump has a pump position sensor.

5. The method as claimed in claim 1, wherein the vehicle braking system has a brake master cylinder to which the second chamber of the piston pump is connected.

6. The method as claimed in claim 1, further comprising:
   actuating the pump valve counter-synchronously with respect to the wheel valve.

7. The method as claimed in claim 1, further comprising:
   opening the wheel valve and the pump valve in response to the wheel brake pressure not being controlled.

8. The method as claimed in claim 1, further comprising:
   actuating the pump valve, which connects the piston pump to the brake master cylinder, counter-synchronously with respect to the wheel valve in order to control the wheel brake pressure.

9. The method as claimed in claim 8, further comprising:
   opening the wheel valve and the pump valve in response to the wheel brake pressure not being controlled.

10. The method as claimed in claim 9, further comprising:
    opening the pump valve during a suction stroke of the piston pump and closing the pump valve during a delivery stroke of the piston pump in order to increase the wheel brake pressure during wheel brake pressure control operations.

11. The method as claimed in claim 2, further comprising:
    opening the pump valve during a suction stroke of the piston pump and closing the pump valve during a delivery stroke of the piston pump in order to increase the wheel brake pressure during wheel brake pressure control operations.

12. The method as claimed in claim 11, further comprising:
    closing the pump valve during the suction stroke of the piston pump and opening the pump valve during the delivery stroke of the piston pump in order to reduce the wheel brake pressure during wheel brake pressure control operations.

13. The method as claimed in claim 12, further comprising:
    opening the wheel valve and the pump valve in response to the wheel brake pressure not being controlled.

* * * * *